(12) United States Patent
P H et al.

(10) Patent No.: US 11,702,817 B2
(45) Date of Patent: Jul. 18, 2023

(54) SYSTEM AND METHOD FOR CHANGING ORIENTATION OF MACHINES

(71) Applicant: Caterpillar Underground Mining Pty. Ltd., South Burnie (AU)

(72) Inventors: Pradeep Kumar P H, Chennai (IN); Peter John Broughton, Kyneton (AU); Arun Anandan, Chennai (IN)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 379 days.

(21) Appl. No.: 17/029,857

(22) Filed: Sep. 23, 2020

(65) Prior Publication Data

US 2021/0115647 A1    Apr. 22, 2021

(30) Foreign Application Priority Data

Oct. 17, 2019    (AU) .................................. 2019250202

(51) Int. Cl.
*E02F 9/20* (2006.01)
*G05D 1/02* (2020.01)

(52) U.S. Cl.
CPC ......... *E02F 9/2045* (2013.01); *G05D 1/0212* (2013.01); *G05D 2201/021* (2013.01)

(58) Field of Classification Search
CPC ............ E02F 9/2045; G05D 2201/021; G05D 1/0212
USPC ........................................................ 701/50
See application file for complete search history.

(56) References Cited

U.S. PATENT DOCUMENTS

| 8,209,075 | B2   | 6/2012  | Senneff et al. |          |
|-----------|------|---------|----------------|----------|
| 8,346,443 | B2 * | 1/2013  | Senneff ................ | A01B 69/007 |
|           |      |         |                | 701/413  |
| 8,965,622 | B2 * | 2/2015  | Ozaki .................. | G05D 1/0278 |
|           |      |         |                | 701/24   |
| 9,717,172 | B2   | 8/2017  | Johnson et al. |          |
| 9,842,501 | B2 * | 12/2017 | Osagawa ............... | G08G 1/166 |
| 10,253,481| B2 * | 4/2019  | Katou ..................... | G09B 29/00 |
| 2008/0208461 | A1* | 8/2008 | Gharsalli ............... | G01C 21/32 |
|           |      |         |                | 701/425  |
| 2012/0136524 | A1* | 5/2012 | Everett ................ | G05D 1/0291 |
|           |      |         |                | 701/25   |
| 2017/0177003 | A1  | 6/2017 | Yokoyama et al. |         |
| 2018/0059668 | A1* | 3/2018 | Kini ........................ | E02F 9/262 |
| 2019/0033873 | A1* | 1/2019 | Kadono ............... | G05D 1/0285 |
| 2019/0113351 | A1  | 4/2019 | Antony         |          |
| 2022/0343585 | A1* | 10/2022| Martikainen ........... | E21F 13/00 |

FOREIGN PATENT DOCUMENTS

| JP | 2018-117558 A | 8/2018 |
| JP | 2019-065660 A | 4/2019 |

* cited by examiner

*Primary Examiner* — Yazan A Soofi

(57) ABSTRACT

A method for changing an orientation of a machine at a worksite includes controlling, by a controller, a movement of the machine from a first position to a second position along a first route; controlling, by the controller, a movement of the machine from the second position to a third position along a second route; and controlling, by the controller, a movement of the machine from the third position towards the first position along a third route, Each of the first route, the second route, and the third route define respective apexes and combinedly define a region therebetween. One or more of the apexes are directed inwards into the region.

18 Claims, 9 Drawing Sheets

SYSTEM AND METHOD FOR CHANGING ORIENTATION OF MACHINES

CROSS-REFERENCE TO RELATED APPLICATION

This application claims priority under 35 USC § 119 and the Paris Convention to Australian Patent Application No, 2019250202 filed on Oct. 17, 2019.

TECHNICAL FIELD

The present disclosure relates to underground mining machines, and more particularly, to a method and a system for changing an orientation of such machines at a work site.

BACKGROUND

Machines, such as underground loaders, are commonly used at work sites, for example, underground mine sites, for performing operations, such as digging, loading, dumping, etc. For performing aforesaid operations, such machines may need to frequently move between multiple locations of the work site (e.g., between a dump location and a load location of the work site). A movement of such machines in underground mine sites is often referred to as 'tramming' An effective tramming operation involves maintaining the machine away at an adequate distance from the surrounding walls of the mine site so as to prevent any machine interference with the surrounding terrain, e.g., with the surrounding walls of the mine site.

In some instances, the machine working at such work sites may only have limited space to maneuver and tram through the expanse of the work site. For example, such work sites may include tunnels that may be generally unevenly cut-out, providing tight and generally just enough room for the machine to pass through. Changing orientation or in other words negotiating a sharp U-turn through such limited spaces, such as from one tunnel to another tunnel, is generally tedious for such machines, and it often becomes challenging to make the machine negotiate the turn without interfering with the surrounding terrain. Such a difficulty is further exacerbated if, at any point during tramming, the machine were required to invert and return to the same tunnel through which it is tramming.

US Patent Publication No. 20080208461 discloses a system for regulating a travel course of a wheel loader. The system includes a path generator that is configured to generate a path on which the wheel loader can travel. The system receives positioning data from position tracking systems, such as global positioning system (GPS) satellites, to determine the location of the wheel loader. Further, a position monitor transmits data relating to the position of wheel loader to the path generator. The path generator determines a minimum steering radius for the wheel loader during the execution of U-turns of the wheel loader.

Reference to any prior art in the specification is not an acknowledgement or suggestion that this prior art forms part of the common general knowledge in any jurisdiction or that this prior art could reasonably be expected to be combined with any other piece of prior art by a skilled person in the art.

SUMMARY OF THE INVENTION

In one aspect, the disclosure is directed towards a method for changing an orientation of a machine at a worksite. The method includes controlling, by a controller, a movement of the machine from a first position to a second position along a first route. Further, the method includes controlling, by the controller, a movement of the machine from the second position to a third position along a second route. The method also includes controlling, by the controller, a movement of the machine from the third position towards the first position along a third route. Each of the first route, the second route, and the third route define respective apexes and combinedly define a region therebetween. One or more of the apexes are directed inwards into the region.

In another aspect, the disclosure is related to a system for changing an orientation of a machine at a worksite. The system includes a controller. The controller is configured to control a movement of the machine from a first position to a second position along a first route. Further, the controller is configured to control a movement of the machine from the second position to a third position along a second route. Furthermore, the controller is also configured to control a movement of the machine from the third position towards the first position along a third route. Each of the first route, the second route, and the third route define respective apexes and combinedly define a region therebetween, with one or more of the apexes being directed inwards into the region.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
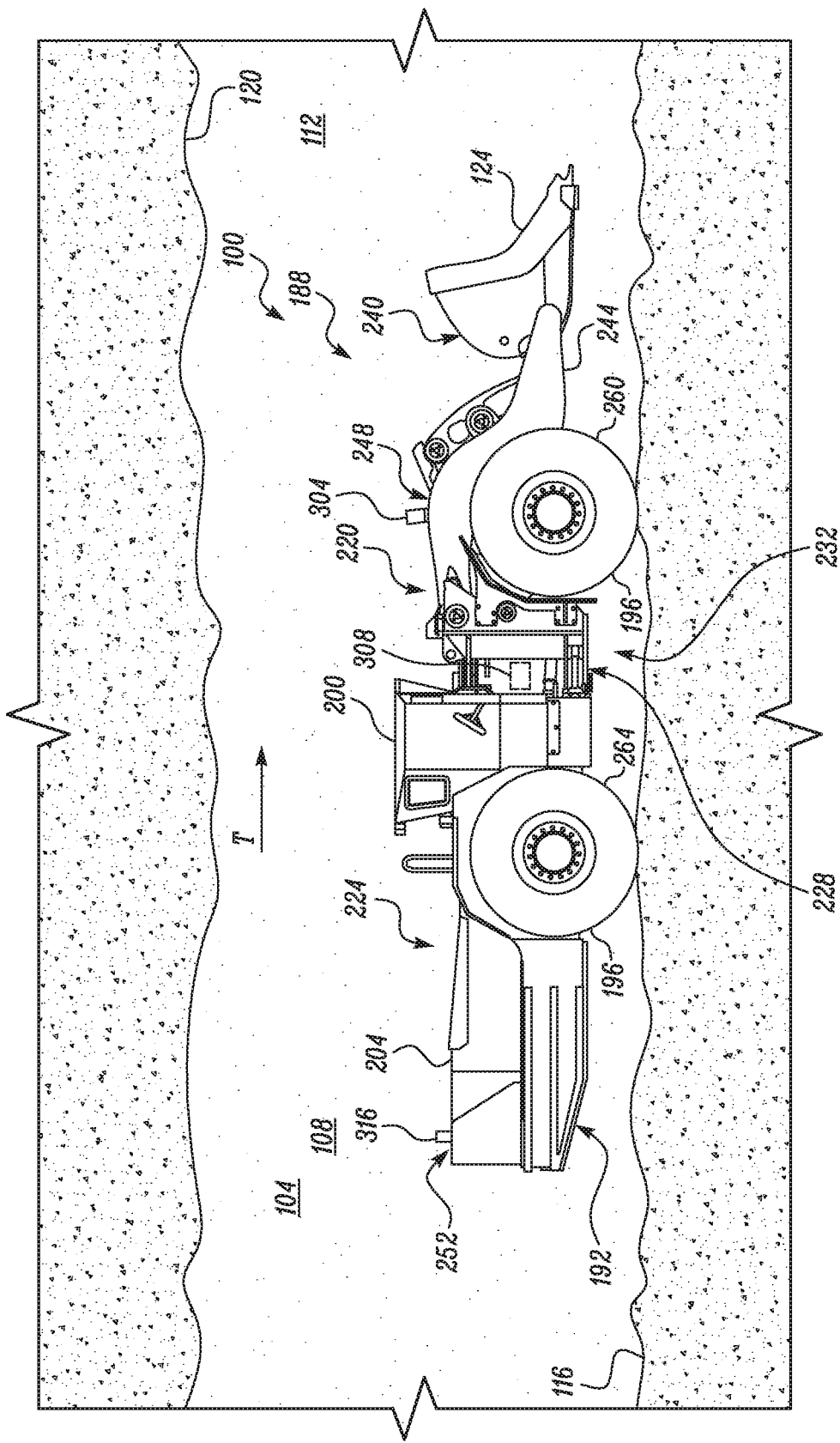
FIG. 1 is a side view of a machine operating at a worksite, in accordance with an embodiment of the present disclosure.

Referring to FIG. 1, an exemplary machine 100, operational at a worksite 104, is illustrated. The worksite 104 may include an underground mine site 108. However, the worksite 104 may include or represent a landfill, a quarry, a construction site, or any other similar type of worksites. The worksite 104 may define a terrain having one or more sidewalls 112, a ground surface 116, and a ceiling 120. Further, the worksite 104 may include one or more load locations (not shown) from where the machine 100 may receive a load (e.g., into a cavity of an implement 124 of the machine 100) and one or more dump locations (not shown) up to where the machine 100 may traverse to so as to release and dump the received load.

Figure 2:
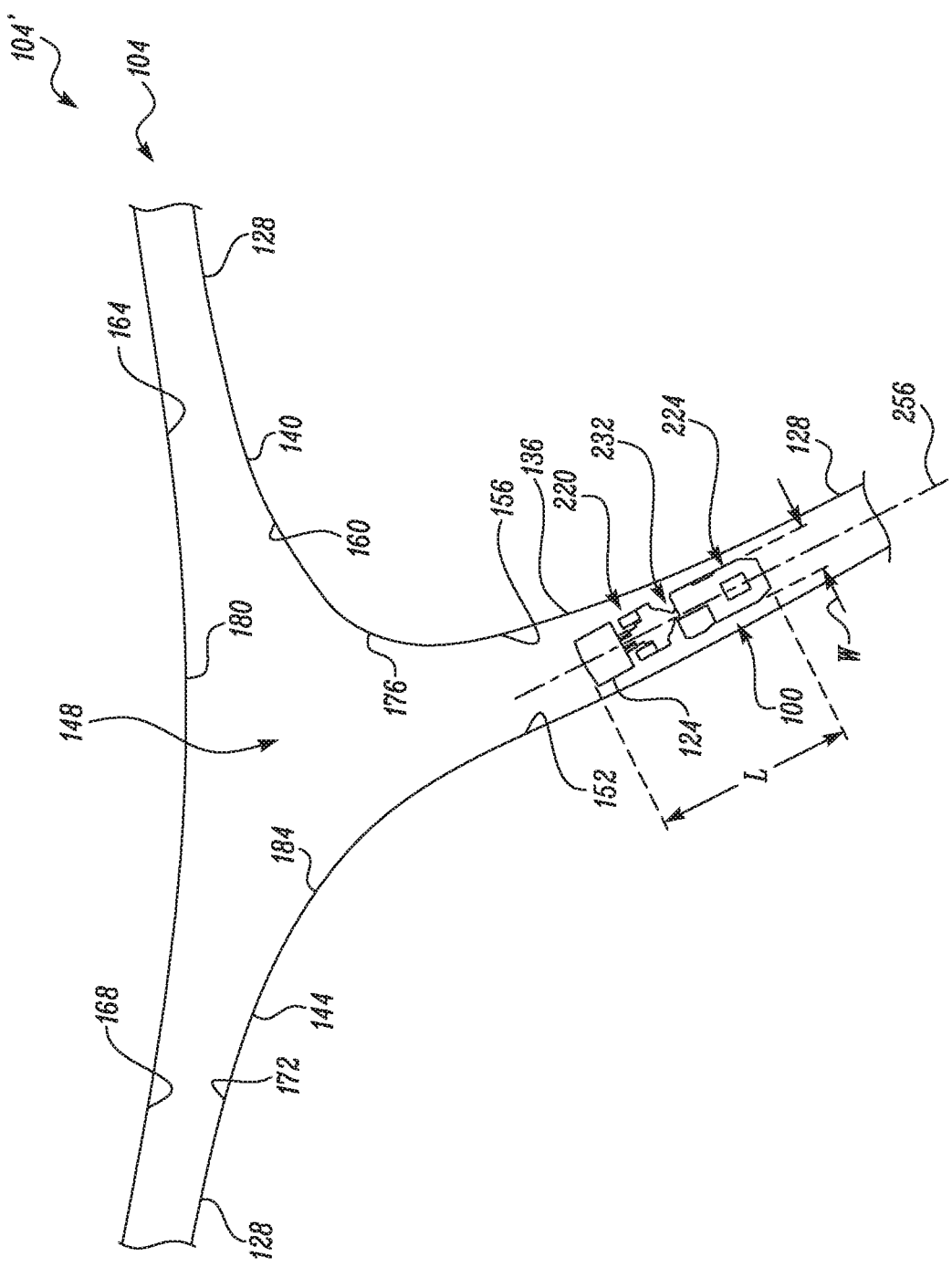
FIG. 2 is a layout of a portion of the worksite including a three-way junction and a three tunnels meeting at the three-way junction, in accordance with an embodiment of the present disclosure.

Referring to FIG. 2, a planned view illustrating a layout of a portion 104' of the worksite 104 is illustrated. As shown, the portion 104' of the worksite 104 may include a number of passageways 128, e.g., tunnels, that may be interconnected with each other to define and help envisage various travel routes for the machine 100 to travel from one point (e.g., the load location) to another (e.g., the dump location). According to an example, three tunnels are depicted, however the portion 104' of the worksite 104 may include additional or lesser tunnels as well. The tunnels may include, or may be specifically referred to as, a primary tunnel 136, a secondary tunnel 140, and a tertiary tunnel 144. For ease, the primary tunnel 136, the secondary tunnel 140, and the tertiary tunnel 144, may be collectively be referred to as tunnels.

Further, various junctions may be defined at the worksite 104 where one tunnel may meet (one or more) other tunnels. As exemplarily shown in FIG. 2, the three tunnels 136, 140, 144 meet at a junction 148 within the portion 104' of the worksite 104—said junction 148 may be referred to as a three-way junction 148, hereinafter. Although not limited, the three-way junction 148 may resemble or be used as a general T-intersection or a T-crossing between the tunnels 136, 140, 144 that may be utilized by the machine 100 to move and/or cross over from one tunnel to another tunnel. In general, it may be further noted that the tunnels 136, 140, 144 and the three-way junction 148 may include a limited or restricted space (i.e., just enough room) for the machine 100 to tram through.

In detail, the primary tunnel 136 may define a first side wall 152 and a second side wall 156, the secondary tunnel 140 may define a third side wall 160 and a fourth side wall 164, and the tertiary tunnel 144 may define a fifth side wall 168 and a sixth side wall 172, as shown. As shown, the second side wall 156 may be merged and be generally continuous with the third side wall 160 to combinedly define a common wall section (e.g., a first wall section 176) extending into both the primary tunnel 136 and the secondary tunnel 140; the fourth side wall 164 may be merged and be generally continuous with the fifth side wall 168 to combinedly define a common wall section (e.g., a second wall section 180) extending into both the secondary tunnel 140 and the tertiary tunnel 144; and the sixth side wall 172 may be merged and be generally continuous with the first side wall 152 to combinedly define a common wall section (e.g., a third wall section 184) extending into both the tertiary tunnel 144 and the primary tunnel 136, as shown.

Figure 3:
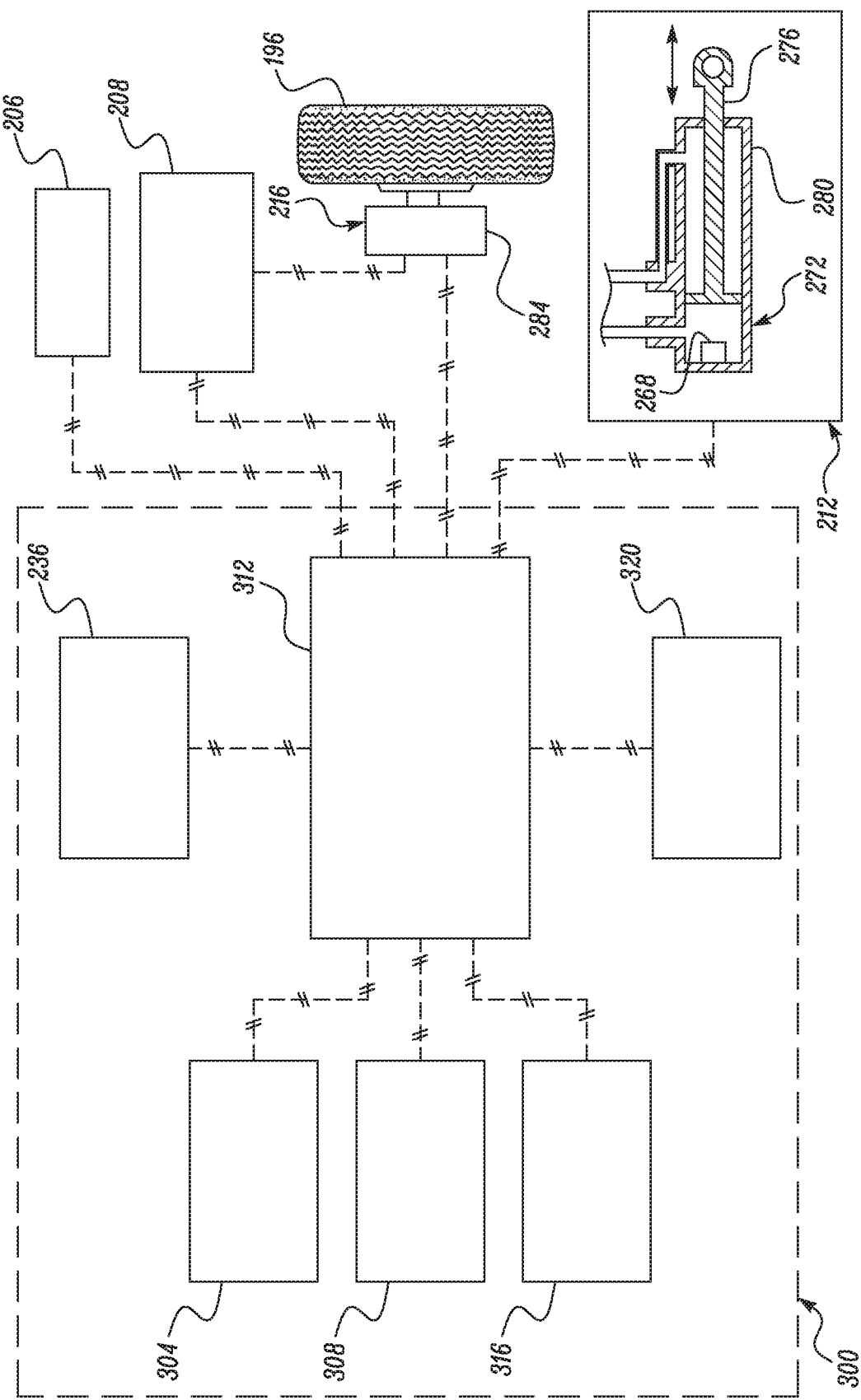
FIG. 3 is a schematic representation of a system for changing an orientation of the machine at the worksite, in accordance with an embodiment of the present disclosure.

Referring to FIGS. 1-3, the machine 100 may be a mobile machine, and, in some embodiments, may include an underground loader 188 tasked with moving various materials at the worksite 104, as shown. However, aspects of the present disclosure are not limited to the machine 100 being an underground loader. Rather, the machine 100 may also be representative of other machines, such as an articulated truck, or any other machine that may be configured to alter a geography of one or more portions of the worksite 104. Accordingly, the machine 100, representing an underground loader 188, need to be seen as being purely exemplary. The machine 100 may include a frame 192, traction devices 196, and an operator cab 200. The machine 100 also may include several other parts and sub-systems, such as a power compartment 204 with a power source 208 (e.g., an internal combustion engine) (see FIG. 3), a transmission system 206, a steering system 212, and a braking system 216 (see FIG. 3).

Referring back to FIG. 1, the frame 192 may include a rigid structure to which nearly every other component (and/or sub-component) of the machine 100 may be coupled to. If the machine 100 were to include an articulated machine, as exemplarily shown, it may be contemplated that the frame 192 may include a forward sub-frame portion 220 and a rearward sub-frame portion 224. The forward sub-frame portion 220 may be pivotably coupled to the rearward sub-frame portion 224 by a hitch 228 disposed at a hitch location 232 defined between the forward sub-frame portion 220 and the rearward sub-frame portion 224. By way of the hitch 228, the forward sub-frame portion 220 may pivot or articulate relative to the rearward sub-frame portion 224.

For example, the rearward sub-frame portion 224 may support the operator cab 200 that, apart from housing various parts and systems, such as controls, etc., of the machine 100, may be also applied to accommodate/station one or more operators (not shown) of the machine 100 for the control of the many functions of the machine 100. The operator cab 200 may include a feedback interface 236 (see FIG. 3). The feedback interface 236 may include one or more of a display unit, a speaker unit, a control panel, a touchscreen, and/or the like, that may be accessed by one or more operators of the machine 100 so as to feed certain input related to a functioning of the machine 100. While the feedback interface 236 may be housed within the operator cab 200 as suggested above, optionally, the feedback interface 236 may be deployed remote to the machine 100, for example, at a central control station or a monitoring station associated with the machine 100/worksite 104—this may be applicable if the machine 100 were a semi-autonomous or a fully autonomous machine and/or if no operator were required to be present within the machine 100, during operations. In one embodiment, the feedback interface 236 may be used by an operator to feed-in an input and generate a corresponding command to invert the machine 100 or change an orientation of the machine 100 at the worksite 104. Apart from the operator cab 200, the rearward sub-frame portion 224 may also support the power compartment 204 to house the power source 208.

The forward sub-frame portion 220 may support an implement assembly 240 of the machine 100. The implement assembly 240 may include the implement 124 and a linkage 244. The implement 124 may be a bucket or a work tool that may be configured to engage with various regions and/or materials of the worksite 104. For example, the implement 124 may engage with a heap of materials disposed at a load location of the worksite 104, and may scoop and receive the materials therein (i.e., within a cavity of the implement 124) for a transfer of the materials to a dump location of the worksite 104. The linkage 244 may be coupled (e.g., movably) to the forward sub-frame portion 220, and the implement 124 may be in turn coupled (e.g., movably) to the linkage 244. A movement of the linkage 244 relative to the forward sub-frame portion 220 may translate into a movement of the implement 124 relative to the forward sub-frame portion 220. One or more actuators (e.g., hydraulic actuators) (not explicitly shown) may facilitate a movement of the linkage 244 relative to the forward sub-frame portion 220, and, similarly, one or more actuators (e.g., hydraulic actuators) (not explicitly shown) may facilitate a movement of the implement 124 relative to the linkage 244. In some embodiments, the forward sub-frame portion 220 of the machine 100 defines a longitudinal axis 256 (see FIG. 2) passing midway to a width, W, of the machine 100 and extending along a length, L, of the machine 100.

The forward sub-frame portion 220 may define a forward end 248 of the machine 100, while the rearward sub-frame portion 224 may define a rearward end 252 of the machine 100. The terms 'forward' and 'rearward', as used herein, are in relation to an exemplary direction of travel of the machine 100, as represented by arrow, T, in FIG. 1, with said direction of travel being exemplarily defined from the rearward end 252 towards the forward end 248. Such an exemplary direction of travel, as noted, may be reversed by the machine 100, as and when required.

The traction devices 196 may be operably coupled to the frame 192 and may be configured to receive power from the power source 208 (see FIG. 3) for propelling the frame 192 (and thus the machine 100), thereby facilitating the machine's travel exemplarily along direction, T, through the worksite 104. The traction devices 196 may include wheels, although other types of traction devices, such as endless tracks or crawler tracks, may be contemplated for employment either alone or in combination with the wheels. The traction devices 196 may include a pair of forward wheels 260 (operably coupled to the forward sub-frame portion 220) and a pair of rearward wheels 264 (operably coupled to the rearward sub-frame portion 224), as shown.

Referring now to FIG. 3, The steering system 212 is configured to power the steering and a turning of the forward wheels 260 towards the sides, e.g., a left-hand side or a right-hand side, of the machine 100 so as to steer the machine 100 towards those sides during a travel of the machine 100. For example, each of the forward wheels 260 and the rearward wheels 264 may be able to turn about their respective axes so as to enable the machine 100 to move laterally towards the sides. The terms 'left-hand side' and 'right-hand side' may be understood as the machine 100 is viewed from the rearward end 252 towards the forward end 248. A similar steering system (not shown) may be available to steer the rearward wheels 264 as well, although, in some cases, it is possible for the steering system 212, which powers the steering of the forward wheels 260, to also power the steering of the rearward wheels 264. Accordingly, it is possible for either one or both the forward wheels 260 and the rearward wheels 264 to define respective steering angles. Various input devices, such as a mini wheel, and the like, adapted to control a functioning of the steering system 212 (e.g., facilitate a manipulation of the forward wheels 260/rearward wheels 264 based on an actuation of such an input device), may be housed with the operator cab 200. In some embodiments, a steering of the machine 100 may be controlled by controlling an angle to which the forward sub-frame portion 220 may be articulated (at the hitch location 232) relative to the rearward sub-frame portion 224. In such a case, the angle to which the forward sub-frame portion 220 may be articulated (at the hitch location 232) relative to the rearward sub-frame portion 224, may be referred to as a steering angle.

In some embodiments, the steering system 212 may include a steering angle sensor 268. The steering angle sensor 268 may be configured to detect a condition of one or more of the components of the steering system 212 so as to facilitate determination of a steering angle of the forward wheels 260 (or of the forward sub-frame portion 220 relative to the rearward sub-frame portion 224) based on the condition. As an example, the steering angle sensor 268 may be configured to detect a duty cycle of a fluid actuator 272 (e.g., comprising a cylinder-rod based arrangement) applied to turn the forward wheels 260 (or articulate the forward sub-frame portion 220 relative to the rearward sub-frame portion 224), and may accordingly help with the determination of a steering angle of the machine 100 based on the duty cycle of the fluid actuator 272.

According to some examples, a duty cycle of the fluid actuator 272 may be computed in percentage and may be understood from the following example—a maximum extension of a rod 276 (of the fluid actuator 272) out of a cylinder 280 (of the fluid actuator 272) may correspond to a 95% duty cycle of the fluid actuator 272, while a maximum retraction of the rod 276 into the cylinder 280 may correspond to a 5% duty cycle of the fluid actuator 272. Exemplarily, at the 95% duty cycle of the fluid actuator 272, the machine 100 may be turned maximum towards the left-hand side (i.e., maximum or largest steering angle of the forward wheels 260 towards the left-hand side or maximum or largest steering angle of the forward sub-frame portion 220 relative to the rearward sub-frame portion 224 towards the left-hand side), while at the 5% duty cycle of the fluid actuator 272, the machine 100 may be turned maximum towards the right-hand side (i.e., maximum or largest steering angle of the forward wheels 260 towards the right-hand side or maximum or largest steering angle of the forward sub-frame portion 220 relative to the rearward sub-frame portion 224 towards the right-hand side). Other known ways of determining the steering angle may be contemplated.

The braking system 216 may include a regenerative braking mechanism with one or more traction motors, as shown (for ease of understanding, only one traction motor, i.e., traction motor 284, is depicted in FIG. 3). The traction motor 284 may include electrical wheel motors, in a manner that one electrical motor may be coupled with each wheel of the forward wheels 260 and the rearward wheels 264. In other embodiments, a single electrical propulsion motor might be used, coupled with an axle adapted to transfer power to the one or both of the forward wheels 260 and the rearward wheels 264. During operation, energy provided by the power source 208 may be used to power the traction motor 284, while during deceleration, the traction motor 284 may be used as generators to reverse a power flow and store energy in a battery. Other braking system types, such as fluid actuated braking systems, may also be contemplated. The braking system 216 may include a braking sensor (not shown) that may be able to sense a degree of a braking force being applied on the traction devices 196 (e.g., the forward wheels 260 and the rearward wheels 264) at any given point.

The transmission system 206 may be operably coupled with the power source 208 and with the traction devices 196, so as to transfer a power generated by the power source 208 all the way to the traction devices 196, and, accordingly, enable a propulsion of the machine 100 over the ground surface 116. The transmission system 206 may include a transfer case (not shown) that may be able to receive a speed as input (received from the power source 208), convert the received input speed to an output speed (e.g., to a varied output speed), and deliver the output speed to the traction devices 196. In some embodiments, the transmission system 206 is able to reverse a travel direction of the machine 100 by reversing a direction of the output speed.

With continued reference to FIG. 3, one or more aspects of the present disclosure is directed towards a system 300 of the machine 100 that facilitates a changing of an orientation of the machine 100 at the worksite 104. An orientation of the machine 100, at any given point, may relate to the direction towards which the forward end 248 of the forward sub-frame portion 220 (and/or the rearward end 252 of the rearward sub-frame portion 224) may be facing. The system 300 is operably coupled to and works in conjunction with each of the power source 208, the transmission system 206, the steering system 212, and the braking system 216, discussed above, and makes the machine 100 move through a set of routes (discussed later) to enable the change in orientation. Such a system (i.e., system 300) is applicable, for example, in cases where the machine 100 is required to return to the same tunnel (e.g., the primary tunnel 136) through which it is traversing or tramming at any given point. More often than not, the machine 100 could navigate all the way to a relatively large expansive area where a conventional U-turn (i.e., a turn in which the machine 100 could continuously follow a curve until its orientation is changed or reversed) could be executed. However, such a large expansive area at or in the vicinity of the worksite 104 may be non-existent, or may be at a considerable distance from a point or region where the machine 100 needs to change its orientation.

While it may be contemplated that the machine 100 may tram all the way up to the three-way junction 148 to attempt the conventional U-turn, it is possible that an area carved out to define the three-way junction 148 may be inadequate and may fall short of a minimum area required by the machine 100 to execute the conventional U-turn, and, rather, the area of the three-way junction 148 may be just enough to permit a unidirectional, one way pass of the machine 100, from one tunnel to another tunnel. It will be appreciated that, in such cases, the system 300 facilitates a changing of an orientation of the machine 100 or an 'inversion' of the machine 100 at said three-way junction 148 in a manner that is different from conventional U-turns. The inversion of the machine 100, as facilitated at the three-way junction 148, may be automated. Said automated inversion also includes a method to prevent the machine 100 from interfering or colliding against the walls 152, 156, 160, 164, 168, 172, of the respective tunnels 136, 140, 144.

It may be contemplated that the three-way junction 148, as discussed herein, is exemplary, and that the system 300 may alternatively utilize any available space of the worksite 104 other than the space afforded by the three-way junction 148 to facilitate the inversion of the machine 100. Further, the system 300 may include multiple components and devices. For example, the system 300 includes a first sensor 304, a second sensor 308, and a controller 312. A configuration and working of each of the first sensor 304, the second sensor 308, and the controller 312, will be now discussed.

The first sensor 304 may be disposed at the forward end 248 of the forward sub-frame portion 220, while the second sensor 308 may be positioned at the hitch 228. The first sensor 304 may be configured to generate (either alone or in combination with other sensors) data related to a position of the forward end 248, while the second sensor 308 may be configured to generate (either alone or in combination with other sensors) data related to a position of the hitch 228. Data related to the position of the forward end 248 may be referred to as a 'forward positional data', while data related to a position of the hitch 228 may be referred to as a 'hitch positional data'. Both the first sensor 304 and the second sensor 308 may be configured to interact with any one of a Global Navigation Satellite System (GNSS), a Global Positioning System (GPS), an Inertial Navigation System, and/or the like, and may interact with the controller 312 to help the controller 312 identify the forward positional data and the hitch positional data. According to some embodiments, each of the forward positional data and the hitch positional data may be determined along the longitudinal axis 256 of the machine 100 (or the forward sub-frame portion of the machine 100).

In some embodiments, the first sensor 304 and the second sensor 308 include perception sensors, such as a light detection and ranging (LIDAR) device, a radio detection and ranging (RADAR) device, a stereo camera, a monocular camera, or another device known in the art. In such a case, both the first sensor 304 and the second sensor 308 may communicate with a number of onsite sensors provided at designated locations of the worksite 104. The first sensor 304, second sensor 308, and the onsite sensors may concertedly operate to gather and generate the positional data associated with the forward end 248 and the hitch 228 (i.e., the forward positional data and the hitch positional data). Although the above discussion related to the first sensor 304 and the second sensor 308, various other sensor types may be contemplated, but without departure from the claimed subject matter.

In some embodiments, the system 300 may include a third sensor 316 positioned at the rearward end 252 of the rearward sub-frame portion 224. Like the first sensor 304 and the second sensor 308, the third sensor 316 may be configured to interact with any one of a Global Navigation Satellite System (GNSS), a Global Positioning System (GPS), an Inertial Navigation System, and/or the like, and may interact with the controller 312 to help the controller 312 identify a 'rearward positional data' related to a position of the rearward end 252 of the rearward sub-frame portion 224. Alternatively, the third sensor 316 may include perception sensors, such as a light detection and ranging (LIDAR) device, a radio detection and ranging (RADAR) device, a stereo camera, a monocular camera, or another device known in the art. In such a case, the third sensor 316 may communicate with a number of onsite sensors provided at designated locations of the worksite 104, and may concertedly operate with the onsite sensors to gather and generate the positional data associated with the rearward end 252 of the rearward sub-frame portion 224 (i.e., the rearward positional data).

The controller 312 may also be communicably coupled (e.g., wirelessly) to the feedback interface 236 so as to receive various commands from the feedback interface 236. For example, the command, receivable by the controller 312 from the feedback interface 236, may pertain to an instruction or command to change an orientation of the machine 100 or to invert the machine 100 at the worksite 104. Based on the command, the controller 312 may be configured to retrieve a set of instructions from a memory 320 and run said set of instructions. By running the set of instructions, the controller 312 may be configured to control various operational parameters of the machine 100, and facilitate the change in the orientation of the machine 100. To control the various parameters of the machine 100, the controller 312 may be communicably coupled (e.g., wirelessly) to the first sensor 304 and the second sensor 308. Further, the controller 312 may be communicably coupled (e.g., wirelessly) to the third sensor 316, as well. Furthermore, the controller 312 may be operably coupled to the power source 208, the braking system 216, and the steering system 212, of the machine 100, as well.

The controller 312 may be configured to receive the forward positional data and the hitch positional data from the first sensor 304 and the second sensor 308, respectively. The controller 312 may be configured to process the forward positional data and the hitch positional data to determine (and/or identify) the forward end 248 of the forward sub-frame portion 220 and the position of the hitch 228 on a map 324 retrieved from the memory 320—such a map 324 may be a prestored map of the worksite 104 and may include data related to the profile of the walls 152, 156, 160, 164, 168, 172, the tunnels 136, 140, 144, a space between the walls 152, 156, walls 160, 164, and walls 168, 172, height of the tunnels 136, 140, 144, and other geometric details, such as dimensions, layout, etc., related to the worksite 104.

Since the controller 312 may be communicably coupled to the third sensor 316 as well, the controller 312 may be also configured to receive the rearward positional data from the third sensor 316. As with processing the forward positional data and the hitch positional data, the controller 312 may be configured to process the rearward positional data to determine (and/or identify) the rearward end 252 of the rearward sub-frame portion 224 on the map 324. In some embodiments, the controller 312 may determine the forward positional data, the hitch positional data, and the rearward positional data, as corresponding points on the map 324—and exemplarily, said corresponding points may be termed as a forward point 326, a hitch point 328, and a rearward point 330, respectively. In some embodiments, the forward point 326 and the hitch point 328 may be defined along the longitudinal axis 256 of the forward sub-frame portion 220 of the machine 100.

Figure 4:
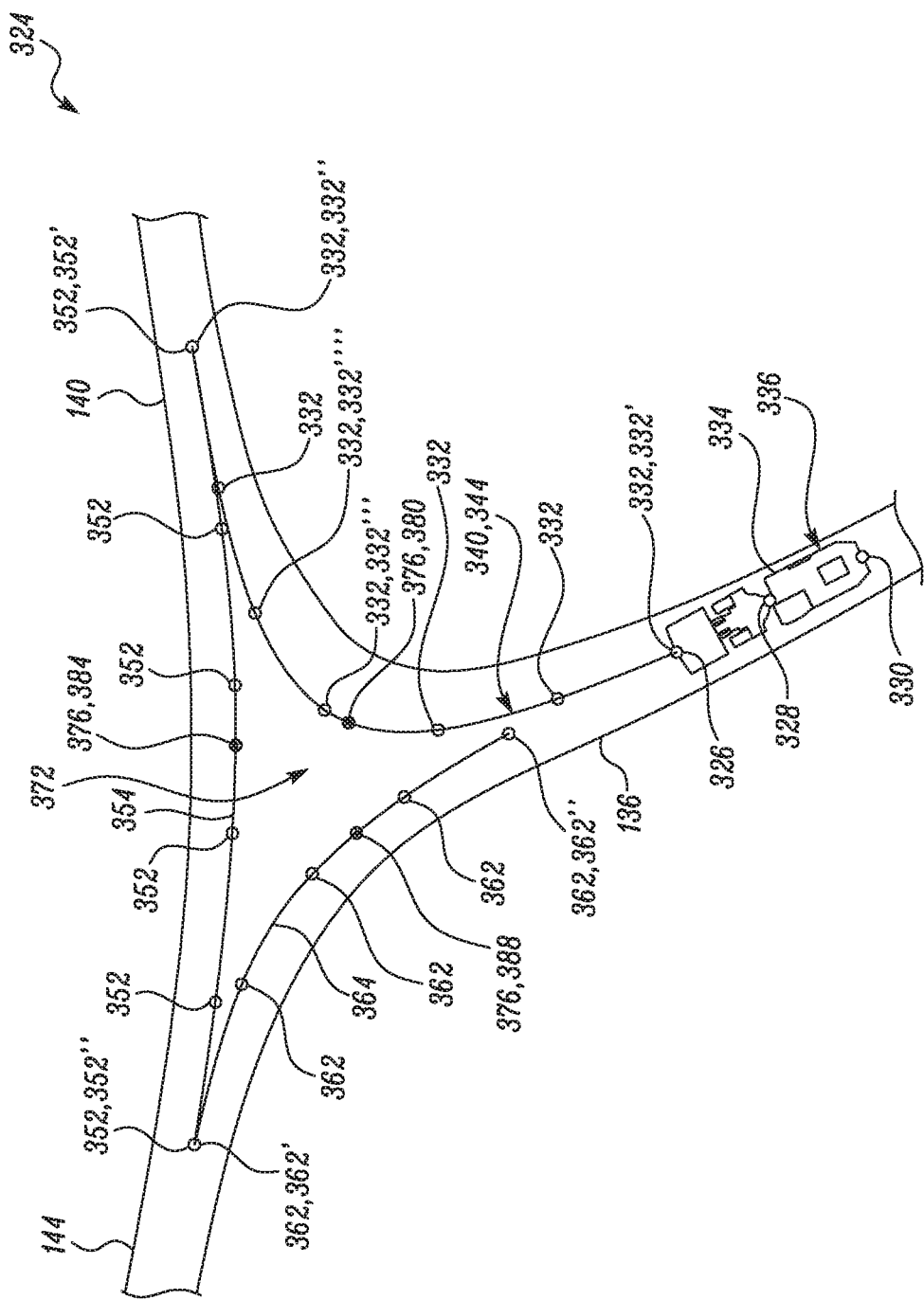
FIG. 4 is an illustration related to various routes executable by the machine for changing its orientation at the worksite, in accordance with an embodiment of the present disclosure.

Referring to FIG. 4, the controller 312 may also generate or fetch a generic machine outline or a generic machine profile 334 from the memory 320, and may co-relate and generate (e.g., dynamically) the generic machine profile 334 on the map 324 based on the forward positional data, the hitch positional data, and the rearward positional data. Such a generic machine profile 334 may be periodically regenerated on the map 324 so as to correspond to the changing positions of the machine 100 on the worksite 104. In so doing, the controller 312 may also determine or track a distance or clearance maintained by the generic machine profile 334 relative to the profile of the walls 152, 156, 160, 164, 168, 172/wall sections 176, 180, 184, on the map 324, and may correspondingly determine an actual clearance being maintained by the machine 100 relative to the walls 152, 156, 160, 164, 168, 172/wall sections 176, 180, 184, while the machine 100 trams through the worksite 104.

In some embodiments, based on the receipt of the command from the feedback interface 236 and by running the set of instructions, the controller 312 may be configured to generate a set of points (e.g., a first set of points 332) on the map 324. Said first set of points 332 may be generated further ahead along a travel direction of the machine 100 (e.g., ahead of the forward end 248 of the forward sub-frame portion 220 on the map 324 or ahead of the forward point 326) up to any closest and upcoming three-way junction (e.g., the three-way junction 148) (or any preselected area which may be used to change the orientation of the machine 100). Notably, the first set of points 332 may be generated by way of coordinates on the map 324. In some embodiments, the controller 312 may detect if the machine 100 has moved up to a prespecified position (e.g., a first position 336) prior to initiating the change in the orientation of the machine 100.

In one embodiment, the controller 312 may co-relate a first point 332' of the first set of points 332 with the forward point 326 (associated with the forward positional data). In other words, the controller 312 may determine the first point 332' to be one and the same as the forward point 326 defined on the map 324. Once the first point 332' is determined, the controller 312 may be configured to determine the other points of the first set of points 332. The other points 332 of the first set of points 332 (up to a last point 332" of the first set of points 332) may define a path 340 that may extend into or be in proximity to either of the secondary tunnel 140 or the tertiary tunnel 144 (i.e., a tunnel which is different from the tunnel within which the machine 100 receives the command) According to an aspect of present disclosure, the controller 312 determines that the path 340 defined by the first set of points 332 should extend into or towards the secondary tunnel 140, and that the machine 100 should first execute a movement along the path 340 into or towards the secondary tunnel 140 in response to the command to change the orientation of the machine 100. The determination of said path's extension into the secondary tunnel 140 may be based on a preset instruction—for example, the preset instruction may notify and help the controller 312 comprehend that the machine 100 should move (e.g., always) towards the nearest tunnel available on the right side of the machine 100 (i.e., the secondary tunnel 140), as and when the command is received.

According to one exemplary embodiment of the present disclosure, the first set of points 332, combinedly defining the path 340, indicates a first route 344 for the machine 100 to move along up to or towards the secondary tunnel 140. Subsequent to the generation of the first set of points 332, the controller 312 may similarly generate a second set of points 352, to define a second route 354, the last point 332" of the first set of points 332 being the first point 352' of the second set of points 352. Thereafter, the controller 312 may similarly generate a third set of points 362, to define a third route 364, the last point 352" of the second set of points 352 being the first point 362' of the third set of points 362. It may be noted that the third route 364 may be directed towards the first route 344 in a manner that the last point 362" of the third set of points 362 of the third route 364 may be in relative proximity to (or, in some cases, overlap or be one and the same as) the first point 332' of the first route 344. The controller 312 may determine that the first route 344, second route 354, and the third route 364, collectively, is part of an inversion scheme 368 that may be utilized to invert the machine 100 or change the orientation of the machine 100 by making the machine 100 move through said routes 344, 354, 364, sequentially. According to some examples, the controller 312 may store the first set of points 332, the second set of points 352, and the third set of points 362, and correspondingly, the first route 344, second route 354, and the third route 364, as a 'route data' in the memory 320, and may retrieve said 'route data' as and when required.

In some embodiments, the first set of points 332, the second set of points 352, and the third set of points 362, may be preset or predefined and thus stored within the memory 320 (or within any external database) relative to an area (e.g., the three-way junction 148) which may be designated as a space within the worksite 104 where the inversion scheme 368 may be applied. Correspondingly, the first route 344, second route 354, and the third route 364, may be predefined as well. In such a case, the controller 312 may be configured to run the set of instructions to fetch and/or retrieve each of the first set of points 332, the second set of points 352, and the third set of points 362, and thus the first route 344, second route 354, and the third route 364, as a 'preset route data' from the memory 320 (or from the external database). Once the 'preset route data' is retrieved, the controller 312 is configured to determine each of the first set of points 332, the second set of points 352, and the third set of points 362, and thus the first route 344, second route 354, and the third route 364, on the map 324.

The routes (i.e., the first route 344, the second route 354, and the third route 364) may combinedly define a region 372 therebetween. As shown, the region 372 defines a generally triangular profile. The term 'generally triangular', as noted, means that the region 372 may not define or be categorized into having any of an equilateral triangular profile, an isosceles triangular profile, or a scalene triangular profile, since the profiles defined by the routes 344, 354, 364 may not be strictly linear, although in some cases, at least some portions of one or more of the routes 344, 354, 364 may be linear. More particularly, each of the first route 344, the second route 354, and the third route 364, may be arcuate routes or may include arcuate profiles that define respective apexes 376. For example, the first route 344 defines a first apex 380; the second route 354 defines a second apex 384; and the third route 364 defines a third apex 388. One or more of the apexes 376 may be directed inwards into the region 372. For example, the arcuate profiles of the first route 344, the second route 354, and the third route 364, may be such that the first apex 380, the second apex 384, and the third apex 388, may be directed inwards into the region 372. In other words, a bulge defined by the arcuate profiles of the routes 344, 354, 364, may be extended inwards into the region 372.

In some embodiments, the routes (i.e., the first route 344, the second route 354, and the third route 364) may define different profiles, and may not include an arcuate profile, as suggested above. For example, one or more of the routes (e.g., the first route 344) may include one or more straight cut or linearly defined paths. For example, the first route 344 may include a first path straightened out from the first point 332' to an intermediate point 332''', and a second path straightened out from the intermediate point 332''' to the last point 332'''. Further, the arcuate profile of the routes 344, 354, 364 may mean that the routes 344, 354, 364 may define varying curved profiles—for example, one or more of the routes 344, 354, 364 may define a parabolic profile or an elliptical profile.

In some embodiments, the routes 344, 354, 364 (and the corresponding sets of points 332, 352, 362 that define the routes 344, 354, 364) may be defined according to the corresponding wall sections 176, 180, 184 extending between the tunnels 136, 140, 144. For example, the first route 344 may be defined according to (e.g., contoured according to) the first wall section 176; the second route 354 may be defined according to (e.g., contoured according to) the second wall section 180; and the third route 364 may be defined according to (e.g., contoured according to) the third wall section 184.

With regard to the first route 344, for example, while the first point 332' of the first set of points 332 defining the first route 344 may be determined based on the forward point 326, the other points 332 of the first set of points 332 may be determined as points that are at least at a minimum distance or offset from the first wall section 176 (i.e., a profile of the first wall section 176 on the map 324). Such a minimum offset may be determined based on the width, W, of the machine 100. In an embodiment, the points 332 of the first set of points 332 of the first route 344 are determined to be at an offset of at least more than half the width, W, of the machine 100. Here, the term 'width' may mean a 'maximum width' of the machine 100, since the machine 100 may have several parts, sections, and structures, disposed along the length, L, of the machine 100, that define varying widths along said length, L.

Further, the first route 344 (and/or the points 332 of the first set of points 332 of the first route 344) may be defined according to a maximum steering angle (or a maximum turn radius) attainable by the steering system 212 vis-à-vis a minimum speed of the power source 208 or of the machine 100. For example, it may be ensured that the first route 344 refrains from defining curve portions that are sharp, entwined, or convoluted, and through which the machine 100 may find it difficult (or impossible) to steer and maneuver through. To this end, the path 340, drawn/defined through the points 332, and by which the first route 344 may be defined, may be defined by simple curves or spline curves. Such simple curves or spline curves may refrain from overlapping or crossing over itself, or, for example, from having curves or bends beyond a preset degree of curvature. For example, such simple curves or splines may generally define a shortest possible distance between any two consecutive points 332 of the first set of points 332, while also maintaining curvature continuity of the path 340 at and along each of the points 332 of the first set of points 332. In so doing, it is ensured that the first route 344 is smooth for a traversal of the machine 100. Since the points 332 may also be defined at a minimum distance or offset from the first wall section 176, the machine 100 may be controlled to follow a course that refrains from interfering with the surrounding terrain (i.e., without interfering or colliding against the first wall section 176 defined by the primary tunnel 136 and the secondary tunnel 140). Similar and equivalent discussions may be contemplated for the second route 354 and the third route 364, as well.

Figure 8:
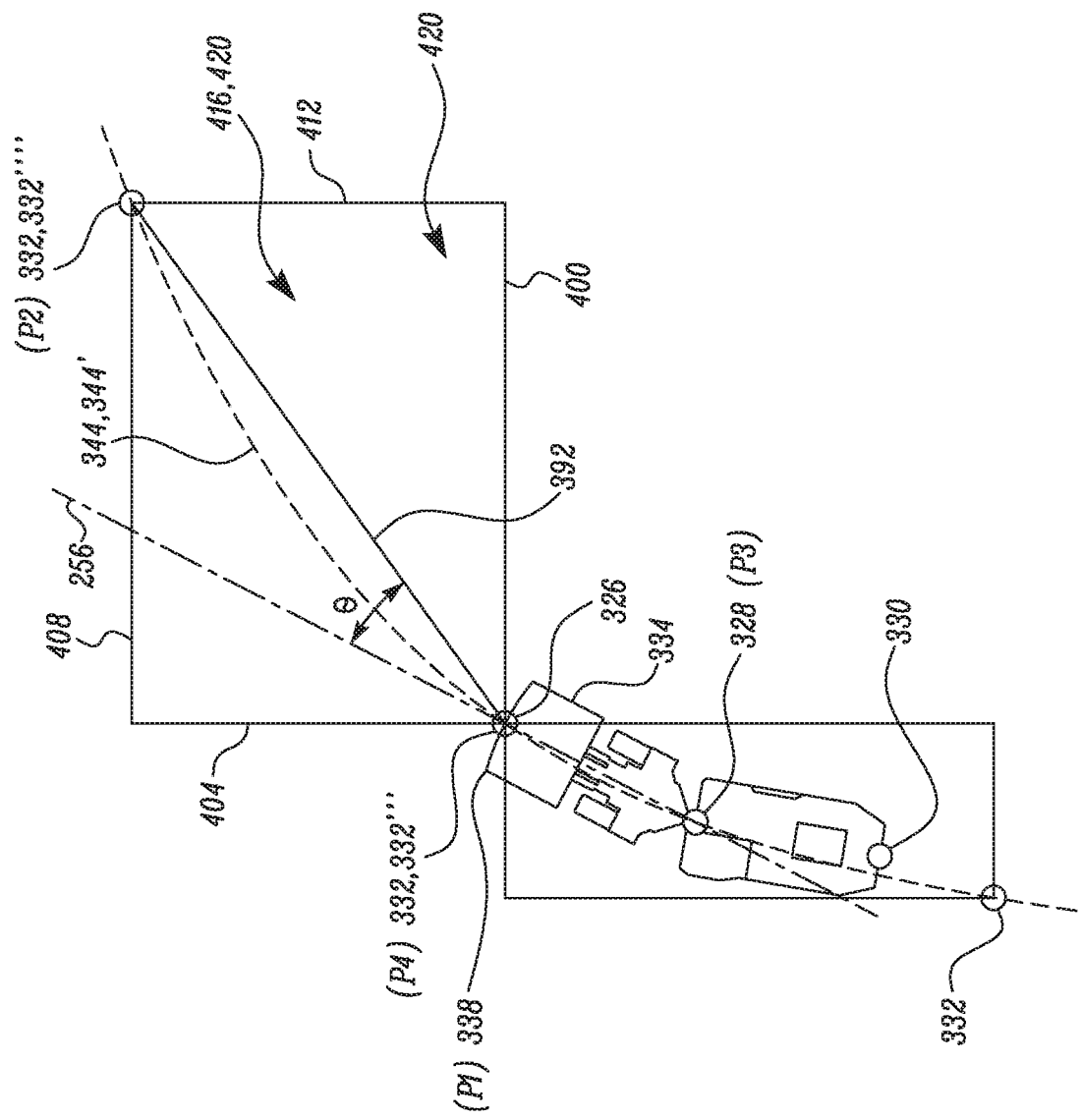
FIGS. 8 and 9 relates to a scheme for attaining machine motion along the various routes, in accordance with an embodiment of the present disclosure.
Figure 9:
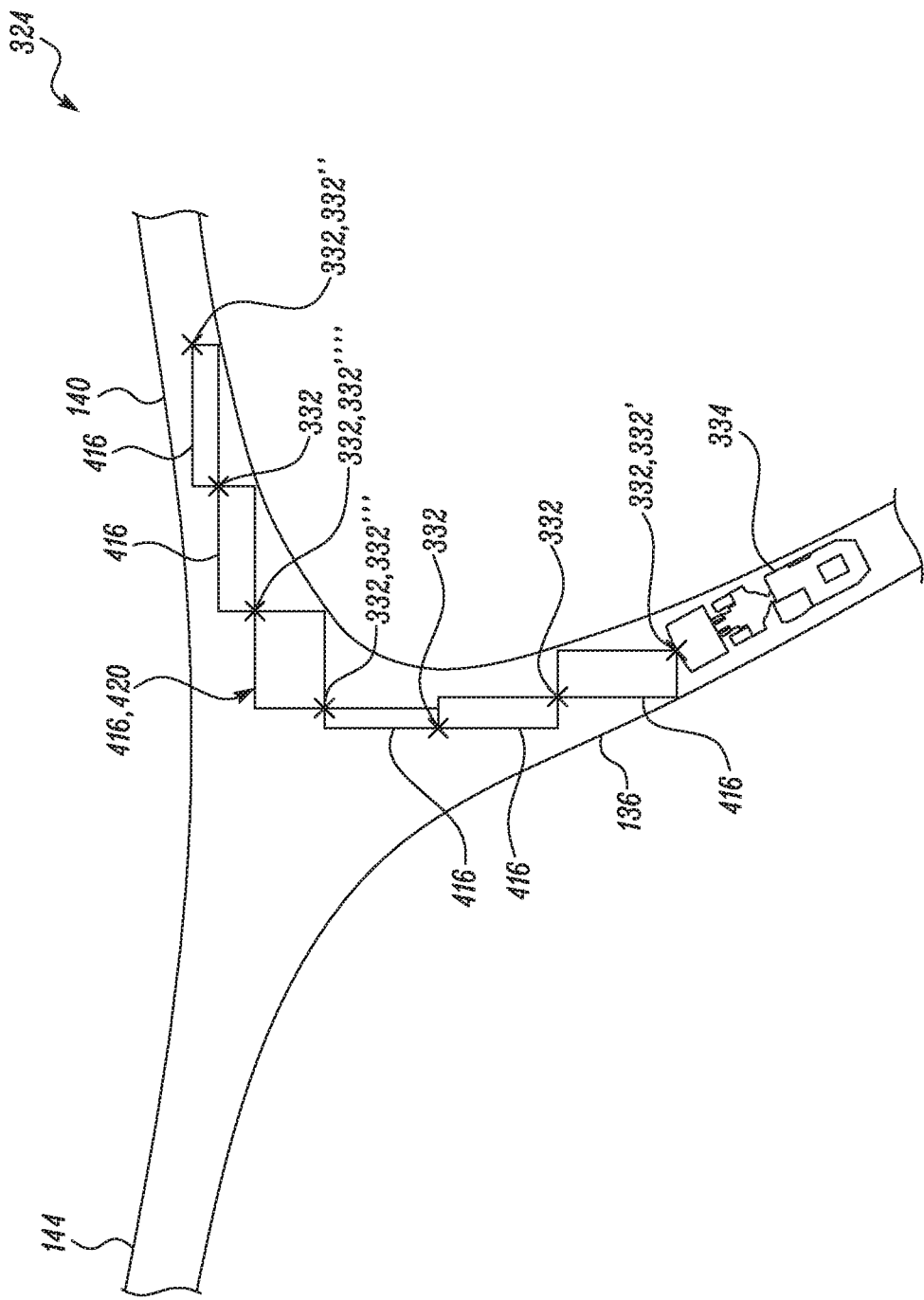

Referring to FIGS. 8 and 9, and in conjunction with FIG. 3, the controller 312 may also be communicably and operably coupled to the transmission system 206, the power source 208, the steering system 212, and the braking system 216, as aforesaid, so as to control a functioning of each of the transmission system 206, the power source 208, the steering system 212, and the braking system 216, during a traversal of the machine 100 through the first route 344, second route 354, and the third route 364.

With reference to FIGS. 8 and 9, the controller 312 may define closed zones successively along the first route 344, the second route 354, and the third route 364. By controlling each of the transmission system 206, the power source 208, the steering system 212, and the braking system 216, the controller 312 may ensure that the machine 100 refrains from interfering with the wall sections 176, 180, 184 defined by the tunnels 136, 140, 144. For example, closed zones may be defined throughout the first route 344 between every consecutive pair of points of the first set of points 332. In other words, for each consecutive pair of points of the first set of points 332, the controller 312 may define two mutually perpendicular lines passing through a first point of the consecutive pair of points 332 and two mutually perpendicular lines passing through a second point of the consecutive pair of points 332 to combinedly define a closed zone therebetween. The many closed zones, annotated as closed zones 416, as defined and formed along the first route 344, may be visualized in FIG. 9. Although not limited, each closed zone 416 includes a rectangular profile, as may also be visualized in FIG. 9.

Referring to FIG. 8, an exemplary method of computing one closed zone 416 among the many closed zones 416 is discussed. The method considers the intermediate point 332''' as a first point 332''' and the point in succession to the intermediate point 332''' (defined along the first route 344 towards the last point 332" on the first route 344) as a second point 332''', as shown. According to one example of defining the closed zone 416 between the first point 332''' and the second point 332'''', the controller 312 may define an axis 392 between the first point 332''' and the second point 332''''. Thereafter, the controller 312 may be configured to define a first line 400 and a second line 404 passing through the first point 332'''. In some embodiments, the first line 400 and the second line 404 may define two mutually perpendicular lines that pass through the first point 332'''. Further, the controller 312 may also define a third line 408 and a fourth line 412 passing through the second point 332''''. As with the first line 400 and the second line 404, the third line 408 and the fourth line 412 may be two mutually perpendicular lines, as well. The controller 312 may define a region defined in between or by the lines 400, 404, 408, 412, as the closed zone 416 between the first point 332''' and the second point 332'''', and may determine the closed zone 416 as a region relative to which the controller 312 may track the machine 100 (i.e., the generic machine profile 334 of the machine 100). This is because the machine 100 (e.g., the forward point 326, the hitch point 328, and the rearward point 330) needs to be largely limited and/or restrained with respect to the closed zone 416 during the movement of the machine 100 from the first point 332''' to the second point 332'''', along the first route 344, such that the machine 100 refrains from interfering with the surrounding terrain (e.g., the first wall section 176). For ease, the closed zone 416 defined between the first point 332''' and the second point 332'''', may be referred to as first closed zone 420.

Before facilitating a movement of the machine 100 along the first route 344, the controller 312 may split the first route 344 into a number of segments. For example, a portion of the first route 344 from the first point 332''' to the second point 332'''' (or a portion of the first route 344 defined within the first closed zone 420) may be referred to as a first route segment 344'. The controller 312 may be configured to compute various characteristics associated with the first route segment 344'. For example, the controller 312 may compute an angle (θ) (e.g., an included angle 'θ', as shown) defined between the axis 392 and the longitudinal axis 256 of the forward sub-frame portion 220 of the machine 100. The controller 312 may determine that higher the angle (θ) defined between the axis 392 and the longitudinal axis 256, proportionally larger (according to a corresponding multiplication factor) may be the steering angle that may be maintained in the direction (i.e., left or right direction) in which the axis 392 is defined relative to the generic machine profile 334. Further, the controller 312 may also determine that higher the angle (θ) defined between the axis 392 and the longitudinal axis 256, proportionally lesser (according to a corresponding multiplication factor) may be the speed of the power source 208 that may be maintained to facilitate a movement of the machine 100 from the first point 332''' to the second point 332''''. During a travel of the machine 100 along the first route segment 344', the first point 332''' may coincide with the longitudinal axis 256 or the forward point 326 of the machine 100.

According to an exemplary embodiment, the angle (θ) may be calculated for each route segment of the first route 344. In the case of the machine's travel through the first route segment 344', for example, the controller 312 may determine various coordinates associated with the position of the generic machine profile 334 of the machine 100 and the first set of points 332 (of the first route 344). For example, as the forward point 326 of the machine 100 may coincide with the first point 332''', the controller 312 may be configured to determine the coordinates of the forward point 326 (which may be same as the coordinates of the first point 332'''), the hitch point 328, and the second point 332''''. Further, the controller 312 may also be configured to determine coordinates associated with an edge 338 of a profile of the implement 124 (as obtained through the generic machine profile 334) on the map 324. For ease, coordinates of the edge 338 may be referred to as p1; coordinates of the second point 332'''' may be referred to as p2; coordinates of the hitch point 328 may be referred to as p3; coordinates of the forward point 326 may referred to as p4. Each of the coordinates may include a corresponding x-coordinate and a corresponding y-coordinate. Given such determination, the angle (θ) (e.g., in radians) may be computed according to the following equation:

$$\text{angle}(\theta) = (a1 - a2),$$

where $$a1 = a\tan2(p2.y - p1.y, p2.x - p1.x); \text{ and}$$

$$a2 = a\tan2(p4.y - p3.y, p4.x - p3.x)$$

In the aforesaid set of equations, p2.y corresponds to y-coordinate of p2; p1.y corresponds to y-coordinate of p1; p2.x corresponds to x-coordinate of p2; p1.x corresponds to x-coordinate of p1; p4.y corresponds to y-coordinate of p4; p3.y corresponds to y-coordinate of p3; p4.x corresponds to x-coordinate of p4; p3.x corresponds to x-coordinate of p3. It may be appreciated that such a determination of the angle (θ) may be contemplated for each route segment of the first route 344. Further, such determination of the angle (θ) may also be contemplated for each route segment of the second route 354 and the third route 364, as well.

Further, the controller 312 may also be configured to determine similar characteristics of all such route segments of the first route 344. Also, the controller 312 may perform similar computation for corresponding route segments of the second route 354 and the third route 364, as well, and may accordingly determine the steering angle (e.g., by access to the steering angle sensor 268) and the machine (or the power source's) speed that needs to be maintained when travelling along those routes. If, in any case, the controller 312 determines that the angle (θ) corresponding to any such segment (of the first route 344, second route 354, and/or the third route 364) is higher than an angle threshold, the controller 312 may determine that a traversal of the machine 100 along that corresponding route segment or along the entire corresponding route or along any of the routes 344, 354, 364, may not be possible. In response, the controller 312 may attempt to reorganize one or more of the sets of points 332, 352, 362 associated with the corresponding routes 344, 354, 364, in an alternate fashion. If the reorganization of the one or more of the sets of points 332, 352, 362 also fail (owing to space constraints at the three-way junction 148, or because, in any route segment, the corresponding angle (θ) remains higher than the angle threshold despite the reorganization), the controller 312 may determine that the inversion scheme 368 applied is unapt and/or unsuitable to change the orientation of the machine 100 at the three-way junction 148. According to some embodiments, said other three-way junctions and/or said similar areas may be preselected and prestored (e.g., in the memory 320), as suggested above.

Figure 5:
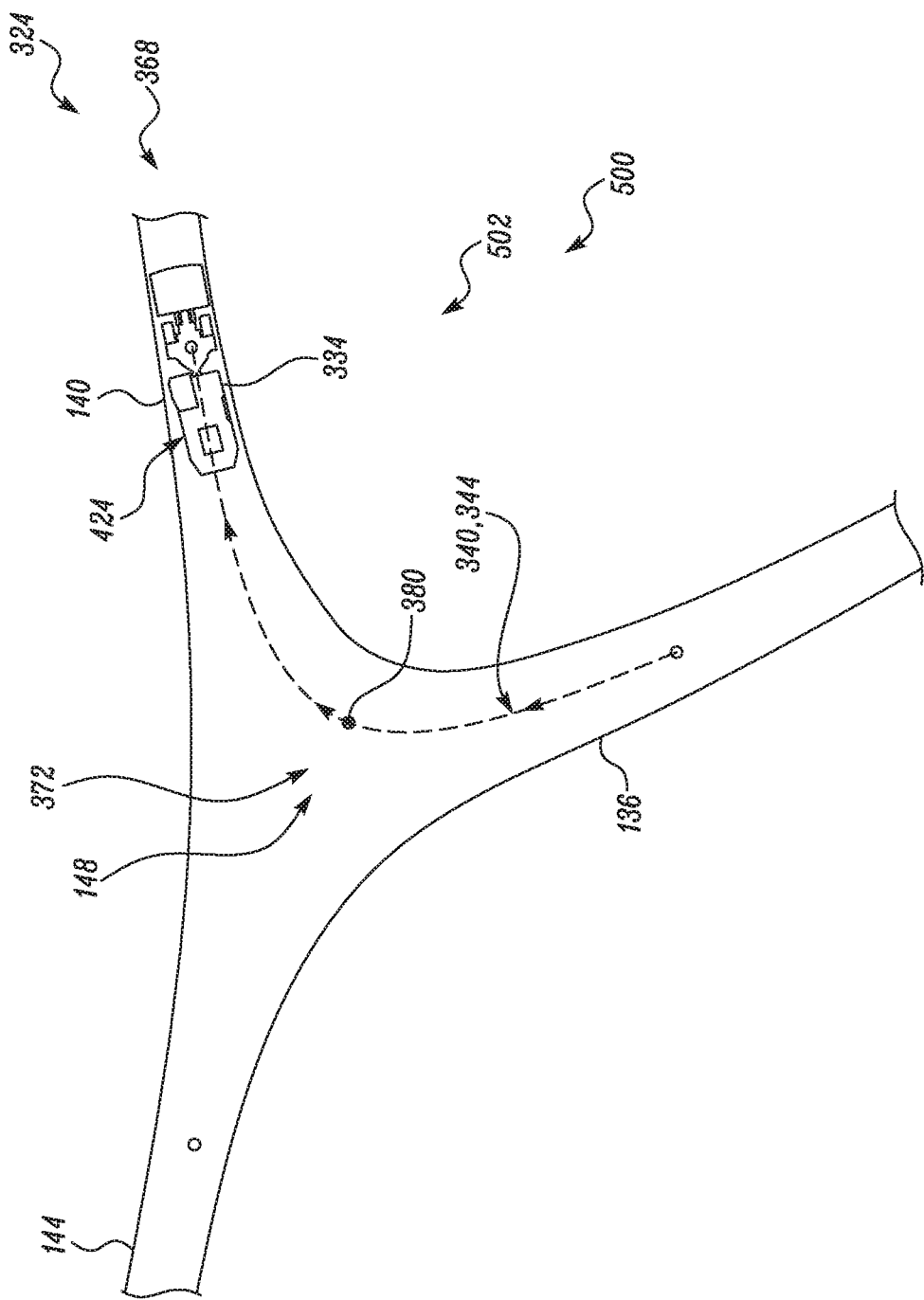
FIGS. 5 to 7 are views illustrating a method by which the machine executes a travel though the routes to navigate through and execute a turn at the three-way junction of the worksite, in accordance with an embodiment of the present disclosure.
Figure 6:
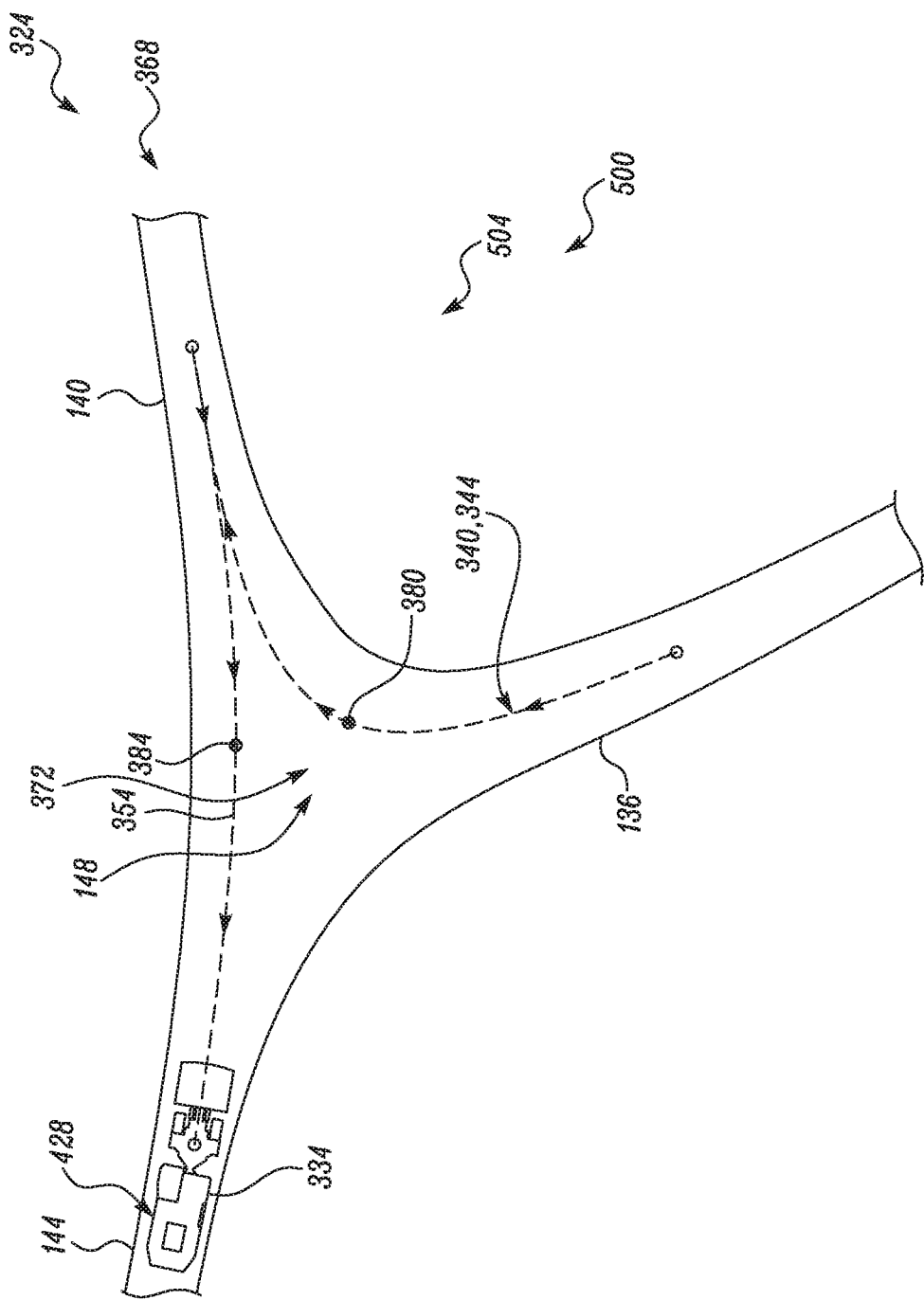
Figure 7:
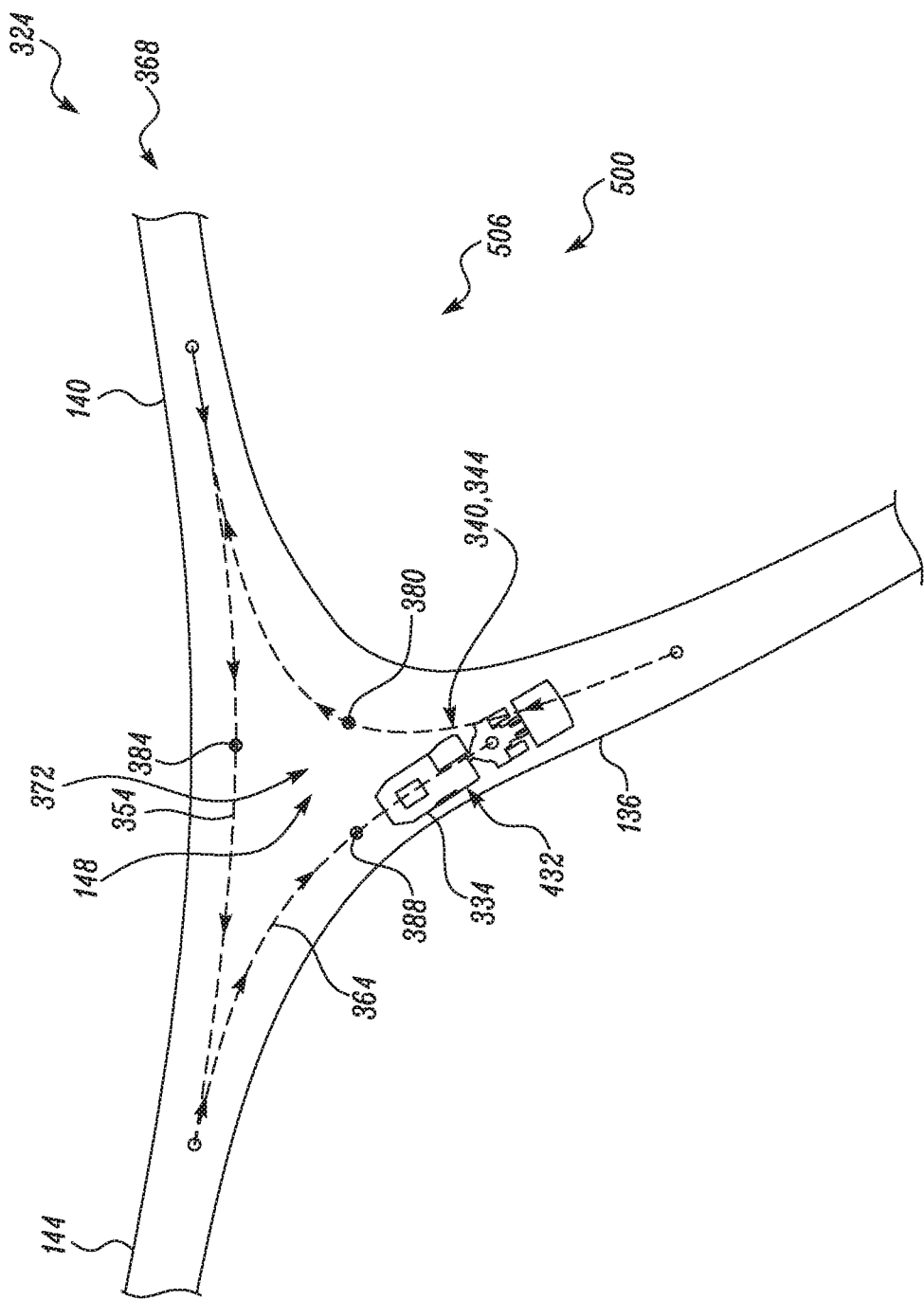

Referring to FIGS. 5, 6, and 7, if the controller 312 determines that the inversion scheme 368 is apt and suitable for inverting the machine 100 or changing the orientation of the machine 100 at the three-way junction 148 (e.g., during the movement of the machine 100 along the routes 344, 354, 364 in real time), the controller 312 may control a movement of the machine 100 from a first position (e.g., the first position 336) to a second position 424 along the first route 344; further, the controller 312 may control a movement of the machine 100 from the second position 424 to a third position 428 along the second route 354; and, thereafter, the controller 312 may control a movement of the machine 100 from the third position 428 towards the first position 336 along the third route 364 (see position 432 of the generic machine profile 334) (see FIG. 7).

Throughout such movement, the controller 312 may track the machine 100 with respect to the closed zones 416 so as to help ensure that the machine 100 does not deviate (e.g., excessively) away from the respective routes 344, 354, 364 or with respect to the closed zones 416 defined along the respective routes 344, 354, 364. More particularly, the controller 312 may track an alignment of the forward point 326, hitch point 328, and the rearward point 330, along the respective routes 344, 354, 364, helping ensure that the forward point 326, hitch point 328, and the rearward point 330, remain (e.g., largely) within the closed zones 416 and that the machine 100 remains away (e.g., sufficiently away) from interference with the wall sections 176, 180, 184), as defined by the tunnels 136, 140, 144. Controlling the movement of the machine 100 along each of the first route 344, the second route 354, and the third route 364, includes controlling (by the controller 312) one or more operating parameters of the machine 100.

For example, the operating parameters of the machine 100 includes a speed of the machine 100, an acceleration of the machine 100 at least at a start of executing each route, a deceleration of the machine 100 at least at an end of executing each route, and a steering of the machine 100. It may be noted that controlling the speed of the machine 100, the acceleration of the machine 100, and the deceleration of the machine 100, includes controlling one or more of a throttling operation of an engine (i.e., when the power source 208 includes an engine), controlling a gear ratio to alter an output speed of the engine through the transmission system 206 (see FIG. 3) of the machine 100, and controlling a braking function by access to the braking system 216 of the machine 100. The controller 312 may also be able to control the transmission system 206, and use the transmission system 206 to reverse a travel direction of the machine 100. In brevity, such a movement of the machine 100 is possible since the controller 312 is communicably coupled to and controllably operates each of the transmission system 206, the power source 208, the steering system 212, and the braking system 216, along the first route 344, second route 354, and the third route 364. Details related to an exemplary working scenario utilizing the aforesaid systems is discussed later in the disclosure.

The controller 312 may be connected to the machine's (i.e., the machine 100) electronic control module (ECM) (not shown), such as a safety module or a dynamics module, or may be configured as a stand-alone entity. Optionally, the controller 312 may be integral and be one and the same as an ECM of the machine 100. More particularly, the controller 312 may be a microprocessor-based device, and/or may be envisioned as an application-specific integrated circuit, or other logic devices, which provide controller functionality, and such devices being known to those with ordinary skill in the art. In one example, it is possible for the controller 312 to include or be representative of one or more controllers having separate or integrally configured processing units to process a variety of data (or input) received from the sensors. Further, the controller 312 may be optimally suited for accommodation within certain machine panels or portions from where the controller 312 may remain accessible for ease of use, service, calibration, and repairs. Optionally, the controller 312 may also be deployed at a remote site either in proximity to the feedback interface 236 or away from the feedback interface 236, and, in some cases, the controller 312 may be hard-wired to the feedback interface 236 and to the sensors, and to various other components and devices of the machine 100.

Processing units, to convert and/or process the signals from the sensors 304, 308, 316 and configured within the controller 312, may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory 320 may include a hard disk drive (HDD), and a secure digital (SD) card. Further, the memory 320 may include non-volatile/volatile memory units such as a random-access memory (RAM)/a read only memory (ROM), which include associated input and output buses. The memory 320 may be configured to store one or more sets of instruction that may be executable by the controller 312 to execute a method 500 of changing the orientation of the machine 100, as will be illustrated by way of a discussion further below.

INDUSTRIAL APPLICABILITY

During operation, as the machine 100 may tram through the primary tunnel 136, an operator of the machine 100 stationed within the operator cab 200, or, alternatively, stationed remotely to the machine 100 (e.g., at a monitoring station associated with the worksite 104) may sense the need to invert the machine 100 or change an orientation of the machine 100. Accordingly, the operator may access the feedback interface 236 and feed into the feedback interface 236 an input that may generate the command to invert the machine 100 or change the orientation of the machine 100. At this point, the machine 100 may be in the first position 336 (or may reach up to the first position 336). In response to the command, the controller 312 may fetch the map 324 from the memory 320 and the forward positional data, hitch positional data, and the rearward positional data, from the first sensor 304, second sensor 308, and the third sensor 316, respectively, and correspondingly generate the forward point 326, hitch point 328, and the rearward point 330, on the map 324. Thereafter, the controller 312 may retrieve the first set of points 332, the second set of points 352, and the third set of points 362 from the memory 320. Optionally, the controller 312 may also generate the first set of points 332, the second set of points 352, and the third set of points 362. Once the first set of points 332, the second set of points 352, and the third set of points 362 are retrieved, the controller 312 determines their positions on the map 324. Further, the controller 312, having access to each of the power source 208, the steering system 212, and the braking system 216, initiates a control of the movement of the machine 100 along each of the first route 344, second route 354, and the third route 364.

In one exemplary working scenario along the first route segment 344' (see FIG. 8) of the first route 344, as the controller 312 controls the power source's operation for movement along the first route segment 344', the controller 312 may simultaneously start tallying positions of the forward point 326, the hitch point 328, and the rearward point 330, with respect to the path 340 of the first route 344. As soon as the controller 312 senses an excessive deviation of the forward point 326 away from alignment to the first route 344 (e.g., an excessive deviation of the forward point 326 towards the left of the first route 344), or as soon as the controller 312 senses that the generic machine profile 334 is tilting or leaning excessively towards any of the lines (e.g., second line 404) defining the corresponding first closed zone 420, the controller 312 may access the power source 208 or the braking system 216 to decelerate or stop the machine 100.

Next, the controller 312 may access the steering system 212 to either turn the traction devices 196 to the right or turn the forward sub-frame portion 220 (with respect to the rearward sub-frame portion 224) to the right. Once such a turning is performed, the controller 312 may reactivate the power source 208 so as to move the forward sub-frame portion 220 to the right and facilitate the forward point's 326 (and the machine's) return to alignment with the first route 344. By following such a protocol, the controller 312 ensures that the machine 100 does not deviate (e.g., excessively) away from the first route segment 344' or from the first closed zone 420 throughout its travel up till the end of the first route segment 344'. Similarly, the controller 312 ensures that the machine 100 does not deviate (e.g., excessively) away from the first route 344 throughout the machine's travel up to the end of the first route 344 or up to the second position 424. Controlling, by the controller 312, a movement of the machine 100 from the first position 336 to the second position 424 along the first route 344 relates or corresponds to a first stage 502 of the method 500 (see FIG. 5).

While reaching up to the last point 332" of the first set of points 332 (i.e., up to the end of the first route 344), the controller 312 may access the power source 208 or the braking system 216 to gradually decelerate the machine's travel and halt said travel at the last point 332" of the first set of points 332 (i.e., at the time when the forward point 326 falls in line, overlaps onto, or falls within a predefined range, with respect to the last point 332" of the first set of points 332). Thereafter, the controller 312 may reverse the machine's travel by accessing the machine's transmission system 206, for example. Further, the controller 312 may access the steering system 212 to turn the traction devices 196 or the forward sub-frame portion 220 relative to the rearward sub-frame portion 224, and may control the power source 208 (e.g., a throttling operation of an engine for acceleration), such that the machine 100 starts moving in reverse causing the rearward point 330 (corresponding to the rearward end 252 of the rearward sub-frame portion 224) to lead the machine's movement and come into alignment with the second route 354. Thereafter, a protocol as followed during the travel of the machine 100 through the first route 344 may be followed along the second route 354 up till the end (i.e., the last point 352") of the second route 354 to the third position 428. Controlling, by the controller 312, a movement of the machine 100 from the second position 424 to the third position 428 along the second route 354 relates or corresponds to a second stage 504 of the method 500 (see FIG. 6).

While reaching up to the last point 352" of the second set of points 352 (i.e., up to the end of the second route 354), the controller 312 may access the power source 208 or the braking system 216 to gradually decelerate the machine's travel and halt said travel at the last point 352" of the second set of points 352 (i.e., at the time when the rearward point 330 falls in line, overlaps onto, or falls within a predefined range, with respect to the last point 352" of the second set of points 352). Thereafter, the controller 312 may access the transmission system 206 to return the machine 100 to forward travel. Further, the controller 312 may access the steering system 212 to turn the traction devices 196 or the forward sub-frame portion 220 relative to the rearward sub-frame portion 224, and may control the power source 208 (e.g., a throttling operation of an engine for acceleration), such that the machine 100 starts moving forward causing the forward point 326 (corresponding to the forward end 248 of the forward sub-frame portion 220) to lead the machine's movement and come into alignment with the third route 364. Thereafter, a protocol as followed during the travel of the machine 100 through each of the first route 344 and the second route 354 may be followed along the third route 364.

By reaching up to the end of the third route 364 or by reaching up to the last point 362" of the third route 364 (i.e., at the time when the forward point 326 returns and falls in line, overlaps onto, or falls within a predefined range, with respect to the last point 362" of the third set of points 362), the machine's orientation (and its travel direction) is changed and the machine 100 is returned to the primary tunnel 136 and/or is inverted in the primary tunnel 136. Controlling, by the controller 312, a movement of the machine 100 from the third position 428 towards the first position 336 along the third route 364 relates or corresponds to a third stage 506 of the method 500 (see FIG. 7).

As exemplarily discussed above, the following may be noted—during the travel of the machine 100 along the first route 344, the machine 100 may define an orientation where the forward end 248 faces forward along a movement of the machine 100 (e.g., along direction, T); during the travel of the machine 100 along the second route 354, the machine 100 may define an orientation where the rearward end 252 faces forward along a movement of the machine 100 (e.g., inverse to direction, T); and during the travel of the machine 100 along the third route 364, the machine 100 may define an orientation where the forward end 248 faces forward along a movement of the machine 100 (e.g., along direction, T). In other words, the machine 100 moving from the primary tunnel 136 towards the three-way junction 148 at the start of the inversion scheme 368 or method 500 with the forward end 248 facing towards the three-way junction 148, may return to the primary tunnel 136 at the end of execution of the inversion scheme 368 or method 500 with the forward end 248 facing towards the primary tunnel 136, away from the three-way junction 148. In effect, as the machine 100 returns to the primary tunnel 136 after the execution of the inversion scheme 368, the machine's orientation is changed (in comparison to the machine's orientation at the start of movement along the first route 344), and, also, the machine's travel direction is reversed (in comparison to the machine's travel direction at the start of movement along the first route 344).

In some embodiments, the controller 312 may be configured to change an orientation of the machine 100 or invert the machine 100, but may keep the travel direction of the machine 100 the same (or largely unchanged). For example, if the machine 100 were required to execute a pass from the primary tunnel 136 into the tertiary tunnel 144, but needed to change the machine's orientation as the machine 100 may pass into the tertiary tunnel 144 from the primary tunnel 136, the controller 312 may stop executing the inversion scheme 368 at the culmination of the machine's journey at the end of the second route 354 (i.e., when the machine 100 reaches up to the last point 352" of the second set of points 352), and may allow the machine 100 to continue its course into the tertiary tunnel 144 with the rearward end 252 facing forward along the machine's travel into the tertiary tunnel 144 (e.g., inverse to direction, T) (see FIG. 6). In such a case, the controller 312 may apply only two routes set out by the inversion scheme 368—e.g., the first route 344 and the second route 354.

In some embodiments, controller 312 may be configured to solely change the travel direction of the machine 100, but may keep the machine's orientation the same. For example, the controller 312 may facilitate a reversal of a travel direction of the machine 100 at the worksite 104 (e.g., by access to the transmission system 206), at any given point, exemplarily allowing the forward end 248 (and the rearward end 252) of the machine 100 to still be facing the same direction.

An inversion of the machine 100 or a change in one or more of an orientation and/or a travel direction of the machine 100, as achieved through the system 300 and method 500 discussed above, allows for flexibility in the machine's travel at worksites where space is a constraint, and where conventional U-turns are unattainable (owing possibly due to the bulk or length of the machines, such as articulated machines). Moreover, the system 300 (by way of the controller 312) ensures that the machine 100 does not deviate (e.g., excessively) away from the respective routes 344, 354, 364, enabling the machine 100 to travel without interfering with the surrounding terrain (e.g., the wall sections 176, 180, 184). Such an inversion may also be applicable in cases where a machine requires to move into tunnels that may be disposed besides and be disposed 'generally' parallelly or along the length of the primary tunnel 136, and into which executing a conventional turn is not possible owing to the length of the machine or the limited space. In particular, the system 300 and method 500, as disclosed, reduces the time required to invert the machine 100 (e.g., to change the orientation of the machine 100 and/or change the direction of the machine 100) by allowing the machine 100 to utilize any nearby three-way junction, as are conventionally found in various worksites, in turn increasing worksite operational efficiency.

By way of clarification and for avoidance of doubt, as used herein and except where the context requires otherwise, the term "comprise" and variations of the term, such as "comprising", "comprises" and "comprised", are not intended to exclude further additions, components, integers or steps.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

The invention claimed is:

1. A method for changing an orientation of a machine at a worksite, the method comprising:
    controlling, by a controller, a movement of the machine from a first position to a second position along a first route;
    controlling, by the controller, a movement of the machine from the second position to a third position along a second route;
    controlling, by the controller, a movement of the machine from the third position towards the first position along a third route,
    wherein each of the first route, the second route, and the third route define respective apexes and combinedly define a region therebetween, with one or more of the apexes being directed inwards into the region;
    determining, by the controller, a first point and a second point along a first route segment of the first route;
    defining, by the controller, a first set of mutually perpendicular lines passing through the first point and a second set of mutually perpendicular lines passing through the second point, wherein the first and second sets of mutually perpendicular lines define a first closed zone associated with the first route segment;
    defining, by the controller, a first closed zone axis extending between the first point and the second point;
    defining, by the controller, a longitudinal axis of the machine;
    determining, by the controller, a first included angle $\theta$ between the first closed zone axis and the longitudinal axis of the machine; and
    controlling, by the controller, at least one of a machine steering angle, a machine speed, a machine acceleration, or a machine deceleration through the first route segment based on the first included angle $\theta$.

2. The method of claim 1, wherein at least one of the first route, the second route, and the third route, is an arcuate route.

3. The method of claim 1 further comprising determining, by the controller, each of the first route, the second route, and the third route, on a map.

4. The method of claim 1, including
    tracking, by the controller, the movement of the machine relative to the first closed zone during the movement of the machine from the first point to the second point.

5. The method of claim 1, wherein the first closed zone includes a rectangular profile.

6. The method of claim 1, wherein the first point coincides with the longitudinal axis of the machine.

7. The method of claim 1, wherein controlling the movement of the machine along each of the first route, the second route, and the third route, includes controlling, by the controller, one or more operating parameters of the machine.

8. The method of claim 1, wherein controlling at least one of the machine steering angle, the machine speed, the machine acceleration, or the machine deceleration through the first route segment comprises controlling one or more of a throttling operation of an engine of the machine, a gear ratio to alter an output speed of the engine, and a braking function of the machine.

9. The method of claim 1, further including detecting, by the controller, a movement of the machine to the first position, prior to initiating a change in the orientation of the machine.

10. A system for changing an orientation of a machine at a worksite, the system comprising:
    a controller, configured to:
        control a movement of the machine from a first position to a second position along, a first route;
        control a movement of the machine from the second position to a third position along a second route;
        control a movement of the machine from the third position towards the first position along a third route
        determine a first point and a second point along a first route segment of the first route;
        define a first set of mutually perpendicular lines passing through the first point and a second set of mutually perpendicular lines passing through the second point, wherein the first and second sets of mutually perpendicular lines define a first closed zone associated with the first route segment;

define a first closed zone axis extending between the first point and the second point;

define a longitudinal axis of the machine;

determine a first included angle θ between the first closed zone axis and the longitudinal axis of the machine; and control at least one of a machine steering angle, a machine speed, a machine acceleration, or a machine deceleration through the first route segment based on the first included angle θ, wherein each of the first route, the second route, and the third route define respective apexes and combinedly define a region therebetween, with one or more of the apexes being directed inwards into the region.

11. The system of claim 10, wherein at least one of the first route, the second route, and the third route, is an arcuate route.

12. The system of claim 10, wherein the controller is further configured to determine each of the first route, the second route, and the third route, on a map.

13. The system of claim 10, wherein the controller is configured to track the movement of the machine relative to the first closed zone during the movement of the machine from the first point to the second point.

14. The system of claim 10, wherein the first closed zone includes a rectangular profile.

15. The system of claim 10, wherein the first point coincides with the longitudinal axis of the machine.

16. The system of claim 10, wherein the controller is configured to control the movement of the machine along each of the first route, the second route, and the third route by controlling one or more operating parameters of the machine.

17. The system of claim 10, wherein controlling at least one of the machine steering angle, the machine speed, the machine acceleration, or the machine deceleration through the first route segment comprises controlling one or more of a throttling, operation of an engine of the machine, a gear ratio to alter an output speed of the engine, and a braking function of the machine.

18. The system of claim 10, wherein the controller is further configured to detect a movement of the machine to the first position, prior to initiating a change in the orientation of the machine.

* * * * *